US008574379B2

(12) United States Patent
Nagahori et al.

(10) Patent No.: US 8,574,379 B2
(45) Date of Patent: Nov. 5, 2013

(54) METHOD FOR CUTTING WITH GAS AND APPARATUS FOR CUTTING WITH GAS

(75) Inventors: Masayuki Nagahori, Saitama (JP); Hirotaka Kamikihara, Tokyo (JP); Takashi Takeda, Chikuma (JP); Toyoyuki Sato, Tokyo (JP); Yasuyuki Yamamoto, Nagasaki (JP); Takashi Kato, Kai (JP)

(73) Assignee: Taiyo Nippon Sanso Corporation, Tokyo (JP)

( * ) Notice: Subject to any disclaimer, the term of this patent is extended or adjusted under 35 U.S.C. 154(b) by 259 days.

(21) Appl. No.: 13/060,843

(22) PCT Filed: Aug. 19, 2009

(86) PCT No.: PCT/JP2009/003946
§ 371 (c)(1),
(2), (4) Date: Feb. 25, 2011

(87) PCT Pub. No.: WO2010/032376
PCT Pub. Date: Mar. 25, 2010

(65) Prior Publication Data
US 2011/0146846 A1    Jun. 23, 2011

(30) Foreign Application Priority Data

Sep. 16, 2008   (JP) .............................. P2008-236703

(51) Int. Cl.
*B23K 7/00*   (2006.01)
(52) U.S. Cl.
USPC .......................................... 148/194; 148/196
(58) Field of Classification Search
USPC ............................. 266/48, 49; 148/194, 196
See application file for complete search history.

(56) References Cited

U.S. PATENT DOCUMENTS 2,552,873 A * 5/1951 Smith ........................... 239/419
2,622,668 A * 12/1952 Buckle ......................... 239/415
4,366,950 A * 1/1983 Hamasaki ...................... 266/49

FOREIGN PATENT DOCUMENTS

JP         59-219391       12/1984
JP         2002-066736     3/2002
(Continued)

OTHER PUBLICATIONS

Notice of Allowance and English translation in JP 2008-236703 mailed Apr. 23, 2013.

*Primary Examiner* — Scott Kastler
(74) *Attorney, Agent, or Firm* — Nixon & Vanderhye P.C.

(57) ABSTRACT

The object of the present invention is to provide a method for cutting with gas which uses a cutting tip including a preheating hole for forming a preheating flame with a fuel gas and an oxygen gas for preheating, and an oxygen gas hole for cutting a workpiece by injecting oxygen gas for cutting, and which can decrease an amount of hydrogen gas used by supply a fuel gas to the preheating hole, which is appropriate in both heating and cutting the workpiece, and an apparatus for cutting with gas, and the present invention provides an apparatus for cutting with gas (30) which supplies an oxygen gas, and a fuel gas to a cutting tip (20) including a preheating hole (23) and an oxygen gas hole for cutting (22), wherein the apparatus (30) includes a supply circuit for oxygen gas (50), a supply circuit for hydrogen gas (41), a supply circuit for hydrocarbon-based gas (45), and a gas supply control means (60), and the gas supply control means (60) can alter a ratio of the hydrogen gas and the hydrocarbon-based gas which are supplied to the preheating hole in a case of heating the workpiece and a case of cutting the workpiece.

10 Claims, 5 Drawing Sheets

(56) References Cited

FOREIGN PATENT DOCUMENTS

| JP | 2003-080368 | 3/2003 |
|----|-------------|--------|
| JP | 2003-129072 | 5/2003 |
| JP | 2004-163054 | 6/2004 |
| JP | 2005-224845 | 8/2005 |
| JP | 2007-000902 | 1/2007 |
| JP | 2008-049349 | 3/2008 |
| WO | 2007/020727 | 2/2007 |

* cited by examiner

METHOD FOR CUTTING WITH GAS AND APPARATUS FOR CUTTING WITH GAS

TECHNICAL FIELD

The present invention relates to a method for cutting with gas which uses a cutting tip including a preheating hole for forming a preheating flame with a fuel gas and an oxygen gas for preheating, and an oxygen gas hole for cutting a workpiece by injecting oxygen gas for cutting, and an apparatus for cutting with gas.

Priority is claimed on Japanese Patent Application, No. 2008-236703, filed on Sep. 16, 2008, the contents of which are incorporated herein by reference.

BACKGROUND ART

For example, when a workpiece, such as a steel plate is cut, a gas cutting method has been widely used in which a cutting start point in the workpiece is heated to a temperature at where an oxidation reaction can be carried out by a preheating flame generated at a preheating hole, and the workpiece is burned and melted to be cut by injecting oxygen gas with a high purity from a cutting oxygen gas hole toward the heated portion.

In the gas cutting method, while the cutting start point in the workpiece is heated and while the workpiece is cut, a hydrocarbon-based gas and an oxygen gas are supplied as fuel gas to generate a preheating flame. However, a hydrogen gas has recently been used instead of the hydrocarbon-based gas (For example, Patent Document No. 1).

According to this gas cutting method, it is necessary to supply a large amount of a hydrogen gas to the preheating hole even when a workpiece is heated. That is, this gas cutting method has a drawback of cost.

Therefore, a technical solution, which can heat the workpiece sufficiently when the workpiece is heated with the preheating flame, and solves the drawback of cost, is desired.

PRIOR ART DOCUMENT

Patent Document

[Patent Document No. 1] Japanese Unexamined Patent Application, First Publication No. 2002-66736

DISCLOSURE OF THE INVENTION

Problems to be Solved by the Invention

In consideration of the above-described problems, it is an object of the present invention to provide a method for cutting with gas which uses a cutting tip including a preheating hole for forming a preheating flame with a fuel gas and an oxygen gas for preheating, and an oxygen gas hole for cutting a workpiece by injecting oxygen gas for cutting, and which can decrease an amount of hydrogen gas used by supply a fuel gas to the preheating hole, which is appropriate in both heating and cutting the workpiece, and an apparatus for cutting with gas.

Means for Solving the Problem

In order to solve the problems, the present invention provides the following inventions.

The present invention relates to a method for cutting with gas which uses a cutting tip including a preheating hole for forming a preheating flame with a fuel gas and an oxygen gas for preheating, and an oxygen gas hole for cutting a workpiece by injecting oxygen gas for cutting, wherein the fuel gas contains at least one of a hydrogen gas and a hydrocarbon-based gas, and a ratio of the hydrogen gas and the hydrocarbon-based gas to be supplied to the preheating hole is altered depending on a case of heating the workpiece and a case of cutting the workpiece.

The present invention relates to an apparatus for cutting with gas which supplies an oxygen gas, and a fuel gas to a cutting tip including a preheating hole for forming a preheating flame with a fuel gas and an oxygen gas for preheating, and an oxygen gas hole for cutting a workpiece by injecting oxygen gas for cutting, wherein the apparatus includes a supply circuit for oxygen gas, a supply circuit for hydrogen gas, a supply circuit for hydrocarbon-based gas, and a gas supply control means; the preheating hole is connected to the supply circuit for oxygen gas, the supply circuit for hydrogen gas, and the supply circuit for hydrocarbon-based gas; a flow rate of a hydrogen gas supplied from the supply circuit for hydrogen gas, and a flow rate of a hydrocarbon-based gas supplied from the supply circuit for hydrocarbon-based gas can be altered; the oxygen gas hole for cutting is connected to the supply circuit for oxygen gas; and the gas supply control means can alter a ratio of the hydrogen gas and the hydrocarbon-based gas which are supplied to the preheating hole in a case of heating the workpiece and a case of cutting the workpiece.

In the method for cutting with gas and the apparatus for cutting with gas, the ratio of an amount of the hydrogen gas and the hydrocarbon-based gas relative to an amount of the fuel gas supplied to the preheating hole is altered depending on a case of heating the workpiece and a case of cutting the workpiece. Therefore, it is possible to form a preheating flame, which is suitable in each case of heating and cutting the workpiece, and decrease the consumed amount of a hydrogen gas.

Moreover, the hydrogen gas, the hydrocarbon-based gas (also refers to a hydrocarbon gas), and the oxygen gas in the present description are not required to have a purity of 100%, and can contain inevitable impurities which are allowed to be contained industrially.

The present invention relates to the method for cutting with gas wherein the hydrogen gas, or a mixed gas of the hydrogen gas and the hydrocarbon-based gas is supplied to the preheating hole in the case of heating the workpiece.

The present invention relates to the apparatus for cutting with gas wherein the gas supply control means supplies a hydrogen gas, or a mixed gas containing the hydrogen gas and the hydrocarbon-based gas in the preheating hole as the fuel gas in the case of heating the workpiece.

According to the method for cutting with gas and the apparatus for cutting with gas of the present invention, it is possible to effectively yield heat sufficient to heat the workpiece, because a fuel gas, which is a hydrogen gas, or a mixed gas of a hydrogen gas and a hydrocarbon-based gas, is supplied to the preheating hole in the case of heating the workpiece.

The present invention relates to the method for cutting with gas wherein a ratio of the hydrocarbon-based gas mixed in the hydrogen gas is 30% by volume or less.

The present invention relates to the apparatus for cutting with gas wherein the gas supply control means adjusts a ratio of the hydrocarbon-based gas mixed in the hydrogen gas to 30% by volume or less.

According to the method for cutting with gas and the apparatus for cutting with gas of the present invention, it is possible to decrease an amount of hydrogen gas used while improving cutting efficiency compared with using only a hydrocarbon-based gas in the case of heating the workpiece.

The present invention relates to the method for cutting with gas wherein a ratio of the hydrocarbon-based gas mixed in the hydrogen gas is 10% by volume or less.

According to the method for cutting with gas, it is possible to decrease an amount of hydrogen gas used while maintaining a cutting efficiency equivalent to that using hydrogen gas.

The present invention relates to the method for cutting with gas wherein the hydrocarbon-based gas is supplied to the preheating hole in the case of cutting the workpiece.

According to the method for cutting with gas of the present invention, it is possible to use no hydrogen gas while maintaining heat energy needed to cut the workpiece.

The present invention relates to the method for cutting with gas wherein a mixed gas containing the hydrogen gas and the hydrocarbon-based gas is supplied to the preheating hole in the case of cutting a workpiece.

According to the method for cutting with gas of the present invention, it is possible to use no hydrogen gas while maintaining heat energy needed to cut the workpiece.

The present invention relates to the method for cutting with gas wherein the hydrocarbon-based gas is LPG.

The present invention relates to the method for cutting with gas wherein the hydrocarbon-based gas is propane gas.

The present invention relates to the method for cutting with gas wherein the hydrocarbon-based gas is butane gas.

According to the method for cutting with gas, it is possible to use gases which are obtained more easily than hydrogen gas, and decrease an amount of hydrogen gas used while maintaining heat energy needed to cut the workpiece.

Effect of the Invention

According to the method for cutting with gas and the apparatus for cutting with gas of the present invention, it is possible to form a preheating flame preferably in each of heating and cutting the workpiece while maintaining heat energy needed, and decrease an amount of hydrogen gas used.

BEST MODE FOR CARRYING OUT THE INVENTION

Figure 1:
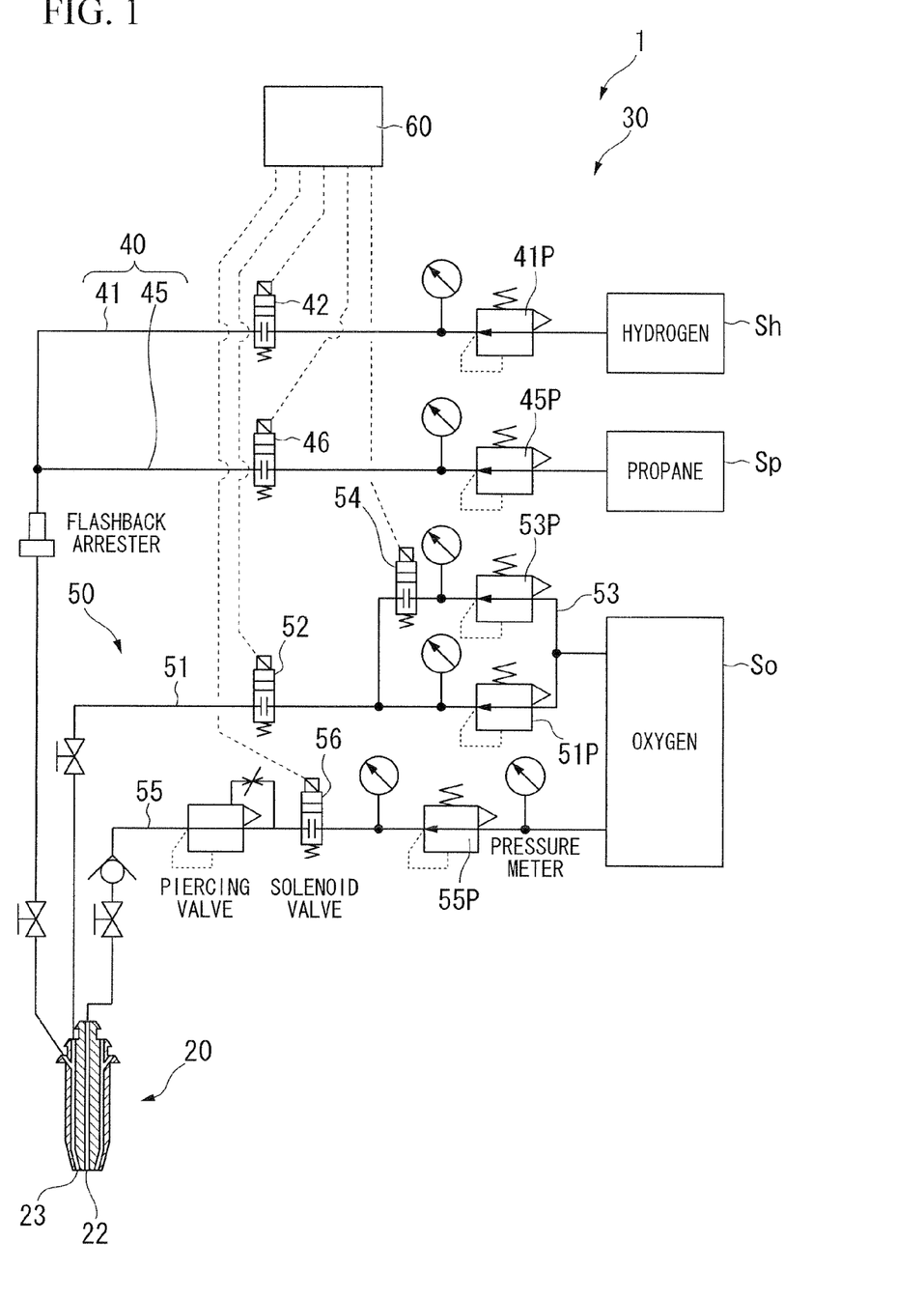
[FIG. 1] is a schematic view showing a gas cutting device according to a first embodiment of the present invention.
Figure 2:
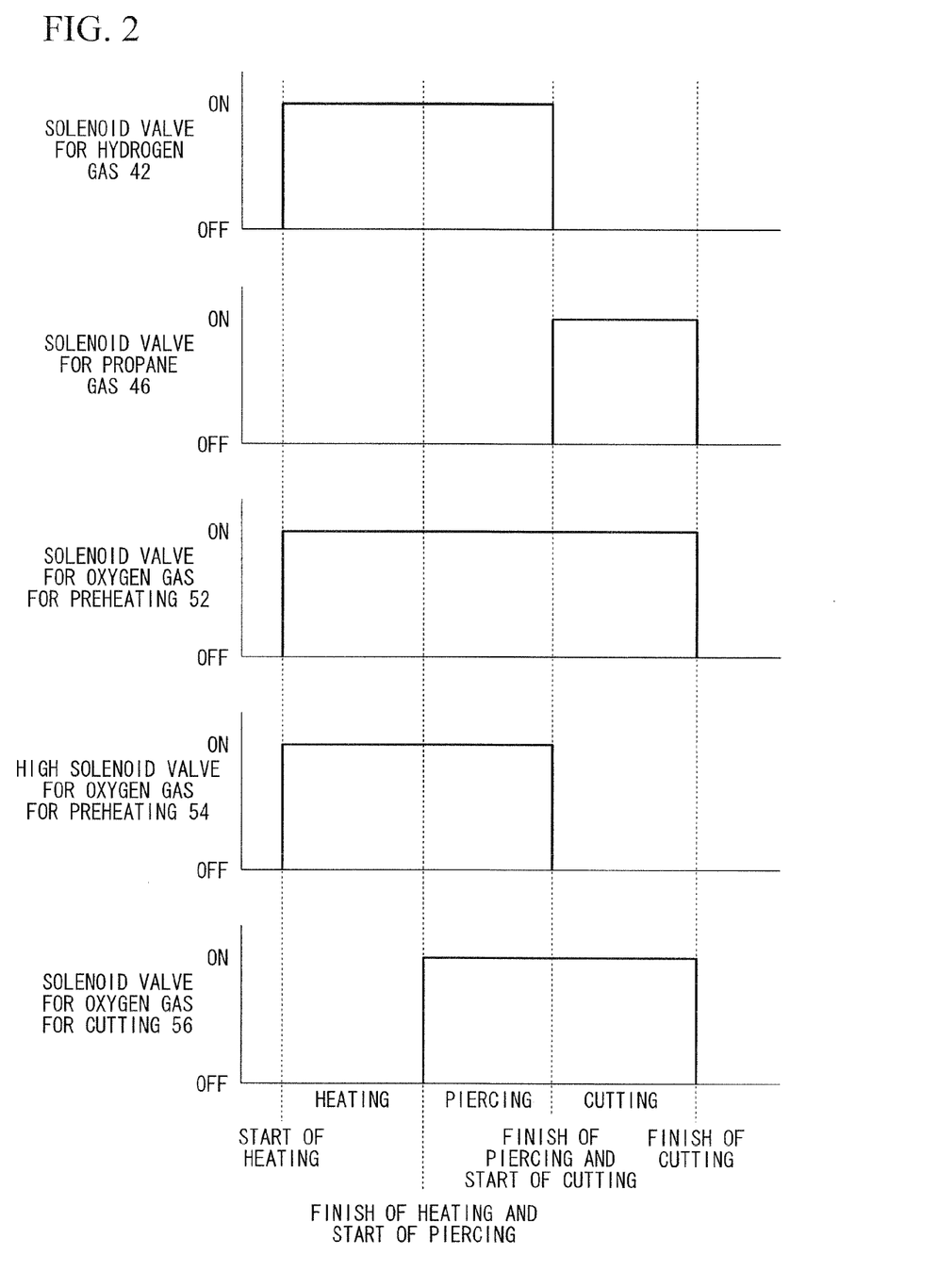
[FIG. 2] is a time chart for explaining functions of the gas cutting device according to a first embodiment of the present invention.

The first embodiment of the present invention is explained referring to FIGS. 1 and 2.

FIG. 1 shows a gas cutting system 1 according to the first embodiment. Reference numeral 20 shows a cutting tip, and 30 shows a gas cutting device. The gas cutting device 30 supplies oxygen gas and fuel gas into the cutting tip 20.

The cutting tip 20, which is pole shape, includes an oxygen gas hole for cutting 22 which is formed at the center of an end surface of the cutting tip 20, and a preheating hole 23 which is formed so as to surround the oxygen gas hole for cutting 22. To the preheating hole 23, fuel gas and oxygen gas are supplied from the gas cutting device 30. Oxygen gas is supplied from the gas cutting device 30 to the oxygen gas hole for cutting 22.

A workpiece is heated by a preheating flame, and cut (including piercing) by injecting oxygen gas from the oxygen gas hole for cutting 22 to the heated portion of the workpiece.

Moreover, the structure of the preheating hole and the cutting oxygen gas hole in the cutting tip, such as number, position, and the relationship therebetween is not particularly limited to this embodiment.

The gas cutting device 30 includes a supply circuit for fuel gas 40, a supply circuit for oxygen gas 50, and a control portion (gas supply control means) 60. The supply circuit for fuel gas 40 and the supply circuit for oxygen gas 50 are connected to the cutting tip 20, respectively.

The supply circuit for fuel gas 40 includes a supply circuit for hydrogen gas 41, and a supply circuit for propane gas 45.

The supply circuit for hydrogen gas 41 is connected to a hydrogen gas supply source Sh, such as a hydrogen gas tank. A pressure regulation valve 41P, and a solenoid valve for hydrogen gas 42 are provided with the supply circuit for hydrogen gas 41 in this order from the hydrogen gas supply source Sh. The solenoid valve for hydrogen gas 42 opens or closes by control signals from the control portion 60 to control the flow of the hydrogen gas.

For example, the supply circuit for propane gas 45 is connected to a propane gas supply source Sp, such as a propane gas tank. A pressure regulation valve 45P, and a solenoid valve for propane gas 46 are provided with the supply circuit for propane gas 45 in this order from the propane gas supply source Sp. The solenoid valve for propane gas 46 opens or closes by control signals from the control portion 60 to control the flow of propane gas.

The supply circuit for oxygen gas 50 includes a supply circuit for oxygen gas for preheating 51 connected to the preheating hole 23 and a supply circuit for oxygen gas for cutting 55 connected to the oxygen gas hole for cutting 22. The supply circuit for oxygen gas 50 is connected to an oxygen gas supply source So, such as an oxygen gas tank.

The supply circuit for oxygen gas for preheating 51 includes a pressure regulation valve 51P and a solenoid valve for oxygen gas for preheating 52 in this order from the oxygen gas supply source So. When the oxygen gas solenoid valve for preheating 52 is opened by the control signals from the control portion 60, oxygen gas for preheating is supplied to the preheating hole 23. In addition, the supply circuit for oxygen gas for preheating 51 is provided with a high circuit for oxygen gas for preheating 53. The high circuit for oxygen gas for preheating 53 supplies high pressure-oxygen gas to the preheating hole 23 when heating and piercing the workpiece.

The high circuit for oxygen gas for preheating 53 is provided between the oxygen gas supply source So and the solenoid valve for oxygen gas for preheating 52. The high circuit for oxygen gas for preheating 53 includes a pressure regulation valve 53P and a high solenoid valve for oxygen gas 54 in this order from the oxygen gas supply source So. When the high solenoid valve for oxygen gas 54 is opened by the control signals from the control portion 60, oxygen gas is supplied to the preheating hole 23 via the high circuit for oxygen gas for preheating 53. The control signals are output when heating and piercing the workpiece.

The supply circuit for oxygen gas for cutting 55 includes a pressure regulation valve 55P and a solenoid valve for oxygen gas for cutting 56 in this order from the oxygen gas supply source So. The supply circuit for oxygen gas for cutting 55 connects between the oxygen gas supply source So and the oxygen gas hole for cutting 22. In addition, the solenoid valve for oxygen gas for cutting 56 in the supply circuit for oxygen gas for cutting 55 opens or closes by the control signals from the control portion 60 to control the flow of the oxygen gas to the oxygen gas hole for cutting 22.

The control portion 60 outputs control signals to an appropriate solenoid valve to open and close the appropriate solenoid valve based on control signals in a heating step, a piercing step, or a cutting step which is carried out by a program. Thereby, desired oxygen gas or fuel gas is supplied to the cutting tip 20. The broken line for connecting the control portion 60 and each solenoid valve in FIG. 1 shows a signal cable for sending control signals from the control portion 60 to each solenoid valve.

Next, the functions of the gas cutting device 30 are explained.

[During Heating]

The solenoid valve for hydrogen gas 42 provided in the supply circuit for hydrogen gas 41 is opened by the control signals from the control portion 60. At the same time, the solenoid valve for oxygen gas for preheating 52 in the supply circuit for oxygen gas for preheating 51 and the high solenoid valve for oxygen gas for preheating 54 in the high circuit for oxygen gas for preheating 53 are opened to supply hydrogen gas and oxygen gas for preheating to the preheating hole 23.

Thereby, hydrogen gas and oxygen gas for preheating are burned in the preheating hole 23 to form a preheating flame. The workpiece is then heated by the preheating flame.

[During piercing]

The control signals from the control portion 60 open the solenoid valve for hydrogen gas 42 in the supply circuit for hydrogen gas 41. At the same time, the control signals from the control portion 60 also open the solenoid valve for oxygen gas for preheating 52 in the supply circuit for oxygen gas for preheating 51 and the high solenoid valve for oxygen gas for preheating 54 in the high circuit for oxygen gas for preheating 53. Thereby, the hydrogen gas and oxygen gas for preheating are supplied to the preheating hole 23.

In addition, the control signals from the control portion 60 open the solenoid valve for oxygen gas for cutting 56 in the supply circuit for oxygen gas for cutting 55, thereby oxygen gas for cutting is supplied to the oxygen gas hole for cutting 22.

As a result, hydrogen gas and oxygen gas for preheating are burned in the preheating hole 23 to form a preheating flame. Thereby, the work is heated. At the same time, oxygen gas for cutting is injected from the oxygen gas hole for cutting 22 toward the heated portion to pierce the work.

[During Cutting]

The control signals from the control portion 60 open the solenoid valve for propane gas 46 in the supply circuit for propane gas 45. At the same time, the control signals open the solenoid valve for oxygen gas for preheating 52. Thereby, a propane gas and oxygen gas are supplied to the preheating hole 23. When cutting, the high solenoid valve for oxygen gas for preheating 54 is closed.

In addition, the oxygen gas for cutting is supplied to the oxygen gas hole for cutting 22 by opening the solenoid valve 56 for oxygen gas for cutting in the supply circuit for oxygen gas for cutting 55.

As a result, propane gas and oxygen gas are burned in the preheating hole 23 to form a preheating flame. Thereby, the work is heated. At the same time, oxygen gas for cutting is injected from the oxygen gas hole for cutting 22 toward the heated portion to pierce the work.

According to the gas cutting device 30, hydrogen gas and the propane gas, which make the fuel gas supplied to the preheating hole 23, are switched (that is, the ratio between hydrogen gas and propane gas in the fuel gas is altered) so as to form an appropriate flame in each of heating, piercing, and cutting the work.

As a result, it is possible to decrease an amount of hydrogen gas used while providing required heat energy.

In addition, since the supply of oxygen gas for cutting to the oxygen gas hole for cutting 22 is varied depending on heating, piercing, and cutting, the work is efficiently heated, pierced, or cut.

As a result, while the work is cut, it is possible to use not hydrogen gas while providing heat energy required to cut the work by supply only propane gas to the preheating hole 23.

Figure 3:
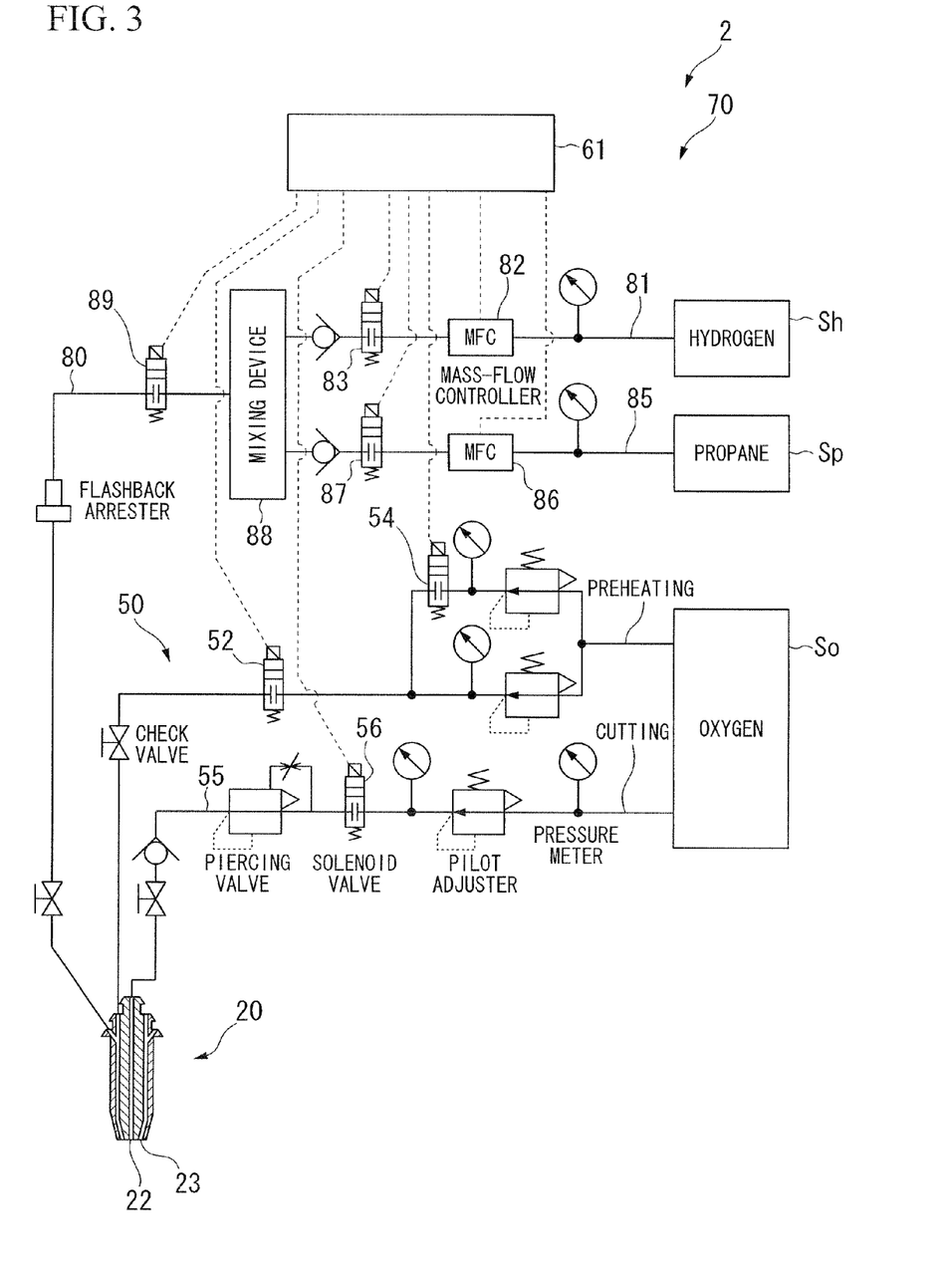
[FIG. 3] is a schematic view showing a gas cutting device according to a second embodiment of the present invention.
Figure 4:
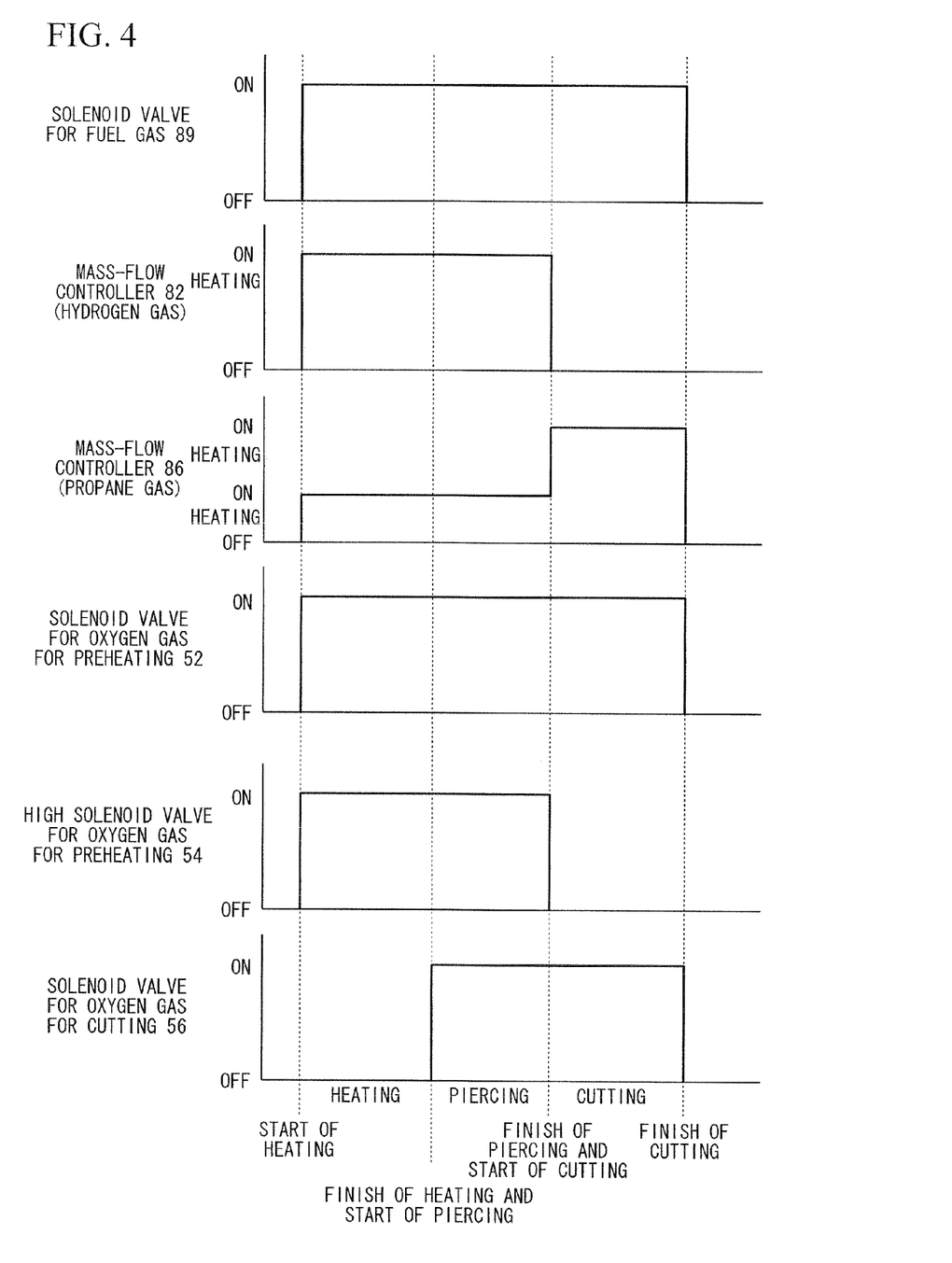
[FIG. 4] is a time chart for explaining functions of the gas cutting device according to a second embodiment of the present invention.

Next, a second embodiment of the present invention is explained referring to FIGS. 3 and 4.

FIG. 3 is a schematic view showing a second gas cutting system. In FIG. 3, reference numeral 70 denotes a gas cutting device.

The gas cutting device 70 is different from the gas cutting device 30 in the following points. Specifically, hydrogen gas and propane gas are supplied by the solenoid valve for hydrogen gas 42 and the solenoid valve for propane gas 46 in the gas cutting device 30. In contrast, the supply of hydrogen gas and propane gas is controlled without steps by a mass-flow controller provided in the supply circuit for hydrogen gas 81 and the supply circuit for propane gas 85, which are disposed in the supply circuit for fuel gas 80, in the gas cutting device 70. The other components are the same as those in the gas cutting device 30. Therefore, an explanation of the same components is omitted in this embodiment.

The gas cutting device 70 includes a supply circuit for fuel gas 80, a supply circuit for oxygen gas 50 and a control portion (control means for gas supply) 61.

The supply circuit for fuel gas 80 includes a supply circuit for hydrogen gas 81, a supply circuit for propane gas 85, a mixing device 88, and a solenoid valve for the fuel gas 89. The supply circuit for hydrogen gas 81 and the supply circuit for propane gas 88 are arranged in parallel, and the downstream side thereof is connected to the mixing device 88. In addition, there is a cutting tip 20 at the downstream side of the mixing device 88. There is a solenoid valve 89 for fuel gas to control the flow of a fuel gas between the mixing device 88 and the cutting tip 20.

The supply circuit for hydrogen gas 81 includes a mass-flow controller 82 and a solenoid valve for hydrogen gas 83. The upstream side of the supply circuit for hydrogen gas 81 is connected to a hydrogen gas supply source Sh. The downstream side of the supply circuit for hydrogen gas 81 is connected to the mixing device 88. The mass-flow controller 82 and the solenoid valve for hydrogen gas 83 are disposed in this order from the hydrogen gas supply source Sh to the mixing device 88.

The supply circuit for propane gas 85 includes a mass-flow controller 86 and a solenoid valve for propane gas 87. The upstream side of the supply circuit for propane gas 85 is connected to a propane gas supply source Sp. The downstream side of the supply circuit for propane gas 85 is connected to the mixing device 88. The mass-flow controller 86 and the solenoid valve for propane gas 87 are disposed in this order from the supply circuit for propane gas 85 to the mixing device 88.

The control portion 61 controls the degree of opening of the mass-flow controllers 82 and 86. At the same time, the control portion 61 opens and closes the solenoid valve for hydrogen gas 83, the solenoid valve for propane gas 87, and the solenoid valve for the fuel gas 89 to control the flow of hydrogen gas, and propane gas.

In the gas cutting device 70 having the components explained above, it is possible to control the degree of the mass-flow controllers 82 and 86 by the control signals from the control portion 61 to adjust the flow rate of hydrogen gas in the supply circuit for hydrogen gas 81 and the flow rate of propane gas in the supply circuit for propane gas 85, Thereby, it is also possible to adjust the mixing ratio (in volume) of the propane gas to the hydrogen gas.

As a result, when the workpiece is heated, pierced, or cut, hydrogen gas, propane gas, or fuel gas containing hydrogen gas and propane gas is supplied to the preheating hole 23 while adjusting the mixing ratio (in volume) between hydrogen gas and propane gas.

Below, the functions of the gas cutting device 70 are explained.

[During Heating]

The degree of opening of the mass-flow controllers 82 and 86 is controlled by the control signals from the control portion 61. At the same time, the solenoid valve for hydrogen gas 83, and the solenoid valve for propane gas 87 open or close so as to conform with the degree of opening of the mass-flow controllers 82 and 86. Thereby, fuel gas (at least one of hydrogen gas, propane gas, and a mixed gas containing hydrogen gas and propane gas) is supplied to the preheating hole 23 via the solenoid valve for the fuel gas 89. During this step, the solenoid valve for the fuel gas 89 opens.

In addition, the control signals open the solenoid valve for oxygen gas for preheating 52 in the supply circuit for oxygen gas for preheating 51 and the high solenoid valve for oxygen gas for preheating 54 in the high supply circuit for oxygen gas for preheating 54 to supply hydrogen gas and oxygen gas for preheating to the preheating hole 23.

As a result, the fuel gas and oxygen gas for preheating are burned in the preheating hole 23 to form a preheating flame. The workpiece is then heated by the preheating flame.

[During Piercing]

The control signals from the control portion 61 control the degree of opening of the mass-flow controllers 82 and 86. At the same time, the solenoid valve for hydrogen gas 83, and the solenoid valve for propane gas 87 open or close so as to conform with the degree of opening of the mass-flow controllers 82 and 86. Thereby, the fuel gas (at least one of hydrogen gas, propane gas, and a mixed gas containing hydrogen gas and propane gas) is supplied to the preheating hole 23 via the solenoid valve for the fuel gas 89. During this step, the solenoid valve for the fuel gas 89 opens.

In addition, the control signals open the solenoid valve for hydrogen gas 83 in the supply circuit for hydrogen gas 81. At the same time, the control signals open the solenoid valve for oxygen gas for preheating 52 in the supply circuit for oxygen gas for preheating 51 and the high solenoid valve for oxygen gas for preheating 54 in the high supply circuit for oxygen gas for preheating 53 to supply the hydrogen gas and the oxygen gas for preheating to the preheating hole 23.

In addition, the control signals from the control portion 61 open the solenoid valve for oxygen gas for cutting 56 in the supply circuit for oxygen gas for cutting 55, to supply oxygen gas for cutting to the oxygen gas hole for cutting 22.

As a result, the fuel gas and oxygen gas for preheating are burned in the preheating hole 23 to form a preheating flame. The workpiece is then heated by the preheating flame. At the same time, the oxygen gas for cutting is injected to the heated portion from the oxygen gas hole for cutting 22 to pierce the workpiece.

[During Cutting]

The control signals from the control portion 60 close the mass-flow controller 82. At the same time, the control signals close the solenoid valve for hydrogen gas 83. Then, the degree of opening of the mass-flow controller 86 is set to a desired degree, and the solenoid valve for propane gas 87 is opened. Thereby, the propane gas is supplied to the preheating hole 23 via the solenoid valve for the fuel gas 89. During this step, the solenoid valve for the fuel gas 89 opens.

In addition, the control signals from the control portion 61 open the solenoid valve for hydrogen 83 in the supply circuit for hydrogen gas 81 to supply the oxygen gas for preheating to the preheating hole 23. During cutting, the high solenoid valve for oxygen gas for preheating 54 closes.

In addition, oxygen gas for cutting is supplied to the oxygen gas hole for cutting 22 by opening the solenoid valve 56 for oxygen gas for cutting in the supply circuit for oxygen gas for cutting 55.

As a result, propane gas and oxygen gas are burned in the preheating hole 23 to form a preheating flame. Thereby, the workpiece is then heated by the preheating flame. At the same time, the oxygen gas for cutting is injected from the oxygen gas hole for cutting 22 toward the heated portion to cut the workpiece.

In the case of heating and piercing the workpiece, when the mixing ratio in volume of propane gas to hydrogen gas is adjusted to 30% by volume or less, it is possible to decrease an amount of hydrogen gas used while providing heat energy of the preheating flame required to heat the workpiece. Therefore, the mixing ratio of the propane gas to the hydrogen gas is preferably 30% by volume or less.

In addition, when the mixing ratio of hydrocarbon-based gas to hydrogen gas is adjusted to 10% by volume or less, it is possible to decrease an amount of hydrogen gas used while providing heat energy which is substantially equal to that obtained by using only hydrogen gas. Therefore, it is more preferable to adjust the mixing ratio of the hydrocarbon-based gas to the hydrogen gas to 30% by volume or less.

According to the gas cutting device 70, during cutting of the workpiece, the mixed gas containing a hydrogen gas and a propane gas is supplied to the preheating hole 23 as fuel gas. Therefore, it is possible to reduce an amount of hydrogen gas used while providing heat energy required to cut the workpiece.

Moreover, the present invention is not limited to these embodiments, and the constitution of the gas cutting device and the method for cutting according to the present invention can be altered as long as any changes made to the constitution are within the scope of the present invention.

Specifically, a propane gas is used as the hydrocarbon-based gas in these embodiments. However, a mixed gas containing LPG (liquid petroleum gas) and at least one of butane and propane can also be used instead of a propane gas.

In addition, a hydrocarbon-based gas other than a propane gas, LPG, and butane gas, and mixed gas thereof can also be used.

In the above embodiments, the hydrogen gas supply source, the propane gas supply source and the oxygen gas supply source are supplied from gas tanks. However, these gas sources do not necessarily need to be from gas tanks. For example, the hydrogen gas supply source may be a hydrogen generation device in which water is electrolyzed to an oxygen gas and a hydrogen gas.

In the above embodiments, the flow of the fuel gas is switched by the solenoid valves or the mass-flow controllers. However, in order to make the flow of gasses smooth and improve the efficiency, the oxygen gas and the fuel gas (including hydrogen gas and hydrocarbon-based gas constituting the fuel gas) can be flowed with an interval by lapping the switching timing of plural solenoid valves or making time lags.

In the above embodiments, the flow of the oxygen gas is controlled by combining plural solenoid valves. However, the flow of the oxygen can also be controlled by other flow rate-control means, such as a mass-flow controller.

Below, the effects obtained by the gas cutting method according to the present invention are explained.

Figure 5:
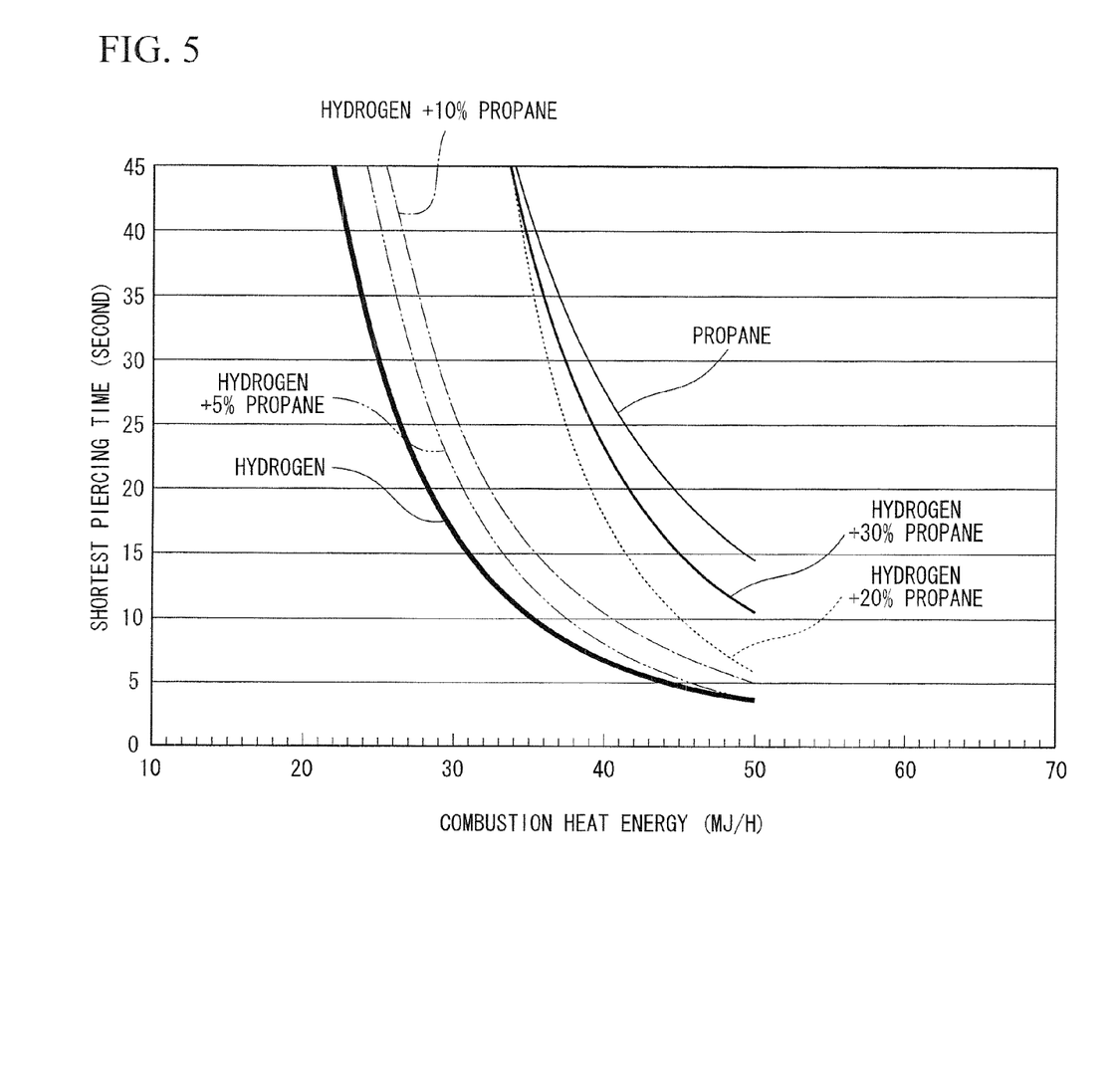
[FIG. 5] is a figure for explaining effects obtained by the method for cutting with gas according to the present invention.

FIG. 5 shows the relationship between the shortest period of time until the workpiece is pierced and the obtained combustion heat energy when the fuel gas contains 30% of propane gas and 70% of hydrogen gas (% means % by volume, in the same way below), the fuel gas contains 20% of propane gas and 80% of hydrogen gas, the fuel gas contains 10% of propane gas and 90% of hydrogen gas, the fuel gas contains 5% of propane gas and 95% of hydrogen gas, and the fuel gas contains 100% of hydrogen gas.

In FIG. 5, the horizontal axis denotes combustion heat energy (MJ/h) when the workpiece is cut, and the longitudinal axis denotes the shortest period of time (second) required to pierce the workpiece. Moreover, the shortest period of time required to pierce the workpiece means the shortest time from the start of heating until an oxidation reaction (combustion) is caused at the heated portion by injecting the oxygen gas for cutting. In other words, the shortest period of time from the start of heating to reaching a temperature at which the oxidation reaction occurs in the workpiece.

Moreover, a lower combustion heat energy in the horizontal axis and, a shorter time required to pierce is more preferable industrially.

According to FIG. 5, in a case where the combustion heat energy is 50 (MJ/h), the shortest piercing time is reduced by about 30% when the fuel gas contains 30% propane and 70% hydrogen gas, compared with the shortest piercing time when the fuel gas is propane gas. In addition, the shortest piercing time when the fuel gas contains 10% propane gas and 90% hydrogen gas is reduced by 65%, compared with the shortest piercing time when the fuel gas is propane gas. From these results, it is clear that the present invention can significantly reduce the amount of hydrogen gas used.

As explained above, even when 30% of propane gas is added in a hydrogen gas, it is possible to provide heat energy required to cut the workpiece while reducing an amount of hydrogen gas used.

Industrial Applicability

According to the gas cutting method and gas cutting device of the present invention, a preheating flame, which is suitable in each of cutting and heating, can be formed while providing sufficient heat energy required to heat the workpiece. Therefore, it is possible to reduce an amount of hydrogen gas used. This is extremely useful in industrial use.

EXPLANATION OF REFERENCE NUMERALS 20 cutting tip
22 oxygen gas hole for cutting
23 preheating hole
30, 70 gas cutting device
40, 80 supply circuit for fuel gas
41, 81 supply circuit for hydrogen gas
42 solenoid valve for hydrogen gas
45, 85 supply circuit for propane gas
46 solenoid valve for propane gas
50 supply circuit for oxygen gas
51 supply circuit for oxygen gas for preheating
52 solenoid valve for oxygen gas for preheating
53 high circuit for oxygen gas for preheating
54 high solenoid valve for oxygen gas for preheating
55 supply circuit for oxygen gas for cutting
56 solenoid valve for oxygen gas for cutting
60 control portion (gas supply control means)
72 mass-flow controller for hydrogen gas
76 Mass-flow controller for propane gas
Sh hydrogen gas supply source
Sp propane gas supply source
So oxygen gas supply source

The invention claimed is:

1. A method for cutting with gas which includes preheating and uses a cutting tip including a preheating hole for forming a preheating flame with a fuel gas and an oxygen gas for preheating, and an oxygen gas hole for cutting a workpiece by injecting oxygen gas for cutting, wherein the fuel gas contains at least one of a hydrogen gas and a hydrocarbon-based gas, and
   a ratio between the hydrogen gas and the hydrocarbon-based gas to be supplied to the preheating hole is altered when heating the workpiece and when cutting the workpiece.

2. A method for cutting with gas according to claim 1, wherein the hydrogen gas, or a mixed gas of the hydrogen gas and the hydrocarbon-based gas is supplied to the preheating hole in the case of heating the workpiece.

3. A method for cutting with gas according to claim 2, wherein a ratio of the hydrocarbon-based gas mixed in the hydrogen gas is 30% by volume or less.

4. A method for cutting with gas according to claim 2, wherein a ratio of the hydrocarbon-based gas mixed in the hydrogen gas is 10% by volume or less.

5. A method for cutting with gas according to claim 2, wherein the hydrocarbon-based gas is supplied to the preheating hole in the case of cutting the workpiece.

6. A method for cutting with gas according to claim 2, wherein a mixed gas containing the hydrogen gas and the hydrocarbon-based gas is supplied to the preheating hole in the case of cutting a workpiece.

7. A method for cutting with gas according to claim 2, wherein the hydrocarbon-based gas is LPG.

8. A method for cutting with gas according to claim 2, wherein the hydrocarbon-based gas is propane gas.

9. A method for cutting with gas according to claim 2, wherein the hydrocarbon-based gas is butane gas.

10. A method for cutting with gas according to claim 1, wherein, when gas is supplied to the preheating hole, a ratio of the hydrogen gas relative to the hydrocarbon-based gas during heating the workpiece is larger than a ratio of the hydrogen gas relative to the hydrocarbon-based gas during cutting the workpiece.

* * * * *

UNITED STATES PATENT AND TRADEMARK OFFICE
CERTIFICATE OF CORRECTION

PATENT NO. : 8,574,379 B2  Page 1 of 1
APPLICATION NO. : 13/060843
DATED : November 5, 2013
INVENTOR(S) : Nagahori et al.

It is certified that error appears in the above-identified patent and that said Letters Patent is hereby corrected as shown below:

Title page, item [75] inventor, should read as follows:

Yasuyuki YAMAMOTO, Nagasaka-shi (JP)

Signed and Sealed this
Twenty-fifth Day of February, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,574,379 B2 | Page 1 of 1 |
| APPLICATION NO. | : 13/060843 | |
| DATED | : November 5, 2013 | |
| INVENTOR(S) | : Nagahori et al. | |

It is certified that error appears in the above-identified patent and that said Letters Patent is hereby corrected as shown below:

Title page, item [75] the fifth inventor, should read as follows:

Yasuyuki YAMAMOTO, Nagasaka-shi (JP)

This certificate supersedes the Certificate of Correction issued February 25, 2014.

Signed and Sealed this
Eighteenth Day of March, 2014

Michelle K. Lee
*Deputy Director of the United States Patent and Trademark Office*